United States Patent [19]

Cree et al.

[11] Patent Number: 4,807,155

[45] Date of Patent: Feb. 21, 1989

[54] ELECTRONIC CALENDARING METHOD FOR CONFIRMATION OF RESOURCE AVAILABILITY DURING EVENT CALENDARING

[75] Inventors: Charles M. N. Cree; Grady J. Landry; Keith J. Scully, all of Austin, Tex.; Harinder S. Singh, Boca Raton, Fla.

[73] Assignee: International Business Machines Corporation, Armonk, N.Y.

[21] Appl. No.: 8,036

[22] Filed: Jan. 29, 1987

[51] Int. Cl.$^4$ .............................................. G06F 15/40
[52] U.S. Cl. ..................................... 364/518; 364/521; 340/706
[58] Field of Search .............................. 368/29, 10, 43; 340/706, 717; 364/521, 200 MS File, 518, 401, 407, 518

[56] References Cited

U.S. PATENT DOCUMENTS

| | | | |
|---|---|---|---|
| 4,591,840 | 5/1986 | Curtis et al. | 340/706 |
| 4,626,836 | 12/1986 | Curtis et al. | 340/706 |
| 4,645,238 | 2/1987 | Vincent et al. | 283/67 |
| 4,700,296 | 10/1987 | Palmer, Jr. et al. | 364/401 |

FOREIGN PATENT DOCUMENTS

| | | | |
|---|---|---|---|
| 0206639 | 12/1986 | European Pat. Off. | 364/407 |
| 0112489 | 6/1986 | Japan | 364/407 |

Primary Examiner—Gary V. Harkcom
Assistant Examiner—Phu K. Nguyen
Attorney, Agent, or Firm—Richard E. Cummins

[57] ABSTRACT

An electronic calendaring method for use in a data processing system having a plurality of interactive type workstations connected to a host processing unit in which the event calendaring process permits the availability of requested event resources to be confirmed automatically during the calendaring of certain events such as meetings which involve participation of a plurality of other calendar owners that are designated in a "Names List" unique to that meeting.

8 Claims, 6 Drawing Sheets

```
MOVE THE CURSOR TO EACH SELECTION OR   KEY   THE ITEM   DIRECTLY   AND   HIT   ENTE
                                       Month              Year
1. Calendar Entry, Meeting,                                  1  2
   Appointment, Trigger,                3  4  5  6  7  8  9
   Note, Vacation,                     10 11 12 13 14 15 16
   Holiday, Offsite,                   17 18 19 20 21 22 23
   Not Normal Work Hours               24 25 26 27 28 29 30
                                       31
2. View Select                         Month              Year
                                              1  2  3  4  5  6
3. Composite Calendar                   7  8  9 10 11 12 13
                                       14 15 16 17 18 19 20
4. Reconcile                           21 22 23 24 25 26 27
                                       28 29 30
5. Automatic Response 6. Conference Room Command: _____

PF1=Help    PF2=Return to System
```

FIG. 3a

```
MOVE THE CURSOR TO EACH SELECTION OR  KEY  THE ITEM  DIRECTLY  THEN  HIT  ENTER
  Classification List: 1 Meeting  2 Appointment  3 Offsite  4 Vacation  5 Holiday
                       6 Note  7 Not Normal Work Hours CLASSIFICATION:  1    (Select one classification number from the above list)
USER DEFINED FIELD _____  (8 characters)
PRIORITY   02    (1=highest,10=lowest)
EVENT IDENTIFIER: D35 MEETING A1
MEETING/APPOINTMENT INFORMATION:
         Date 10/07/86      Start Time:1:15 PM     End Time: 5:00 PM
         Date 10/09/86 R2   Start Time:8:30 PM     End Time: 5:00 PM
       (Rx after Date will repeat the event at the same time, x number of days)
       Names List : D35 NAMES A1
           Caller : TOM ROBERTS
          Subject : 1987 Budget
            Place : Conference Room 128F
          Details :

PF1=Help   PF3=Cancel  PF5=Send Notice  PF6=Begin Search
   PF8=Next Screen(Security, Status, Trigger)  PF9=File  PF11=Add One Line
```

FIG. 3b

```
MOVE THE CURSOR TO EACH SELECTION OR  KEY  THE ITEM  DIRECTLY  AND  HIT  ENTER

SECURITY:       Public    Shared     Private
  (pick one)
STATUS:         Tentative        Confirmed
  (pick one)
TRIGGER:        Message    Audio    Process
  (All three may be picked)
    Date: 10/07/86       Time: 1:00 PM
    Date: 10/09/86       Time: 8:00 AM
(PF11 will scroll and add additional Date Lines while on the Date line)
(Rx after Date will repeat the event at the same time, x number of days)
    Names List:_D35/AUSVM1_(Enter The Notification List VNET Address)
    Message   :_The department meeting starts in 15 minutes_____
              (PF11 will add one line)
    Process   :INVEST01/AUSVM1___Enter The Process VNET Address
              Pick up these calculations before the Budget Meeting TRIGGER FIXED OR FLOAT?      Fixed       Float
     (pick one)
    Float with Event Identifier:__D35 MEETING A1
 (If this event moves, the trigger will be moved to the same relative time)

PF1=Help   PF3=Cancel  PF5=Send Notice PF6=Begin Search
PF7=Previous Screen PF8=Next Screen   PF9=File   PF10=Add One Line
```

FIG. 3c

```
ENTER THE RESPONSE INITIATOR(S)    (Pick one or more)
           MEETING NAME :_____
   MEETING CALLERS'NAME:_____
               USER ID:_____
             SYSTEM ID:_____
    USER DEFINED FIELD:_____
  USER DEFINED PRIORITY:_____

ENTER THE RESPONSE ___   0 = No Action
                         1 = Confirmed (will attend)
                         2 = Tentative (nay attend)
                         3 = Not Attending
                         4 = User Acknowledge (acknowledge invitation)
                         5 = Alternate (the response is for an alternate)

ENTER THE ALTERNATE:
           NAME:_____
        USER ID:_____
      SYSTEM ID:_____
        ADDRESS:_____

PF1=Help  PF3=Cancel  PF11=Add One Line
          PF9=File  PF12=File and Display the next Auto Response Template
```

FIG. 5

```
CONFERENCE ROOMS

NAME            CAPACITY         BLDC/CITY          OWNER
1F13              6              814/AUSTIN         SCULLY
1G15             12              996/AUSTIN         CREE
1815             10              815/AUSTIN         BARKSDALE
870A             20              209/CAPITOLA       TUFT

COMMAND _____(SELECT A CONFERENCE ROOM NAME)

PF1 = HELP   PF3 = CANCEL   PF4 = NEXT SCREEN   PF5 = SELECT AND RETURN
```

FIG. 4a

```
CONFERENCE ROOM 1F13      OWNER   K.J.SCULLY

AVAILABLE

CAPACITY:6                                    AUGUST            1986
PLACE AN X NEXT TO ITEM RESERVE                              1  2
EQUIPMENT:  X  OVERHEAD PROJECTOR              3  4  5  6  7  8  9
            X  PROJECTION SCREEN              10 11 12 13 14 15 16
            __ MOVIE PROJECTOR                17 18 19 20 21 22 23
            __ SLIDE PROJECTOR                24 25 26 27 28 29 30
            __ VCR                            31
            __ TELEVISION
            X  DISPLAY TERMINAL                SEPTEMBER        1986
            __ CONFERENCE PHONE                    1  2  3  4  5  6
            X  WRITING BOARD                   7  8  9 10 11 12 13
            __ OTHER                          14 15 16 17 18 19 20
                   _____(IDENTIFY)         21 22 23 24 25 26 27
            __ (RESERVED)                     28 29 30

CONFERENCE ROOM NAME_____
COMMAND: _____  (Select a Date (MMDDYY) and hit PF4)

PF1 = HELP PF3 = CANCEL  PF5 = PREVIOUS MONTH  PF6 = NEXT MONTH
PF9 = FILE AND RETURN
```

FIG. 4b

ELECTRONIC CALENDARING METHOD FOR CONFIRMATION OF RESOURCE AVAILABILITY DURING EVENT CALENDARING

FIELD OF INVENTION

This invention relates in general to electronic calendaring methods, and in particular, to a calendaring method in which the availability of resources to support an event being calendared is confirmed automatically at the time the event is being calendared.

CROSS-REFERENCES TO RELATED APPLICATIONS

1. Co-pending application Ser. No. 008,034 filed concurrently herewith, entitled "Method For Concurrently Displaying Entries From a Plurality of Different Electronic Calendars Based on Interactively Entered Criteria," and assigned to the assignee of the present application is directed to an electronic calendaring method in which a calendar owner can display a set of calendar entries from different calendars which have an interrelationship that the user defines by data that is entered into the system interactively.

2. Co-pending application Ser. No. 008,039 filed concurrently herewith, entitled "Electronic Calendaring Method to Establish Calendar Floating Triggers for Calendared Events and Processes" and assigned to the assignee of this application is directed to an electronic calendaring method in which a calendar owner can selectively trigger a predefined action in response to detecting one or more criteria related to the calendar event that has previously been defined and entered into the system.

3. Co-pending application Ser. No. 008,249 filed concurrently herewith, entitled "Method For Automatically Reconciling Entries on Two Copies of Independently Maintained Electronic Calendars," and assigned to the assignee of this application is directed to an electronic calendaring method in which a calendar owner who keeps a detached personal copy of his master calendar can automatically reconcile the calendar entries that have been made on each calendar copy, independently of the other since the last time the detached copy was made and interactively resolve calendar event conflicts.

4. Co-pending application Ser. No. 008,033 filed concurrently herewith, entitled "Method For Developing Automatic Replies in an Interactive Electronic Calendaring System," and assigned to the assignee of the present application is directed to an electronic calendaring method in which a calendar owner can respond automatically to requests for participation in events being calendared by another person. The nature of the reply is based on an analysis of the parameters set forth in the request and an algorithm employing a set of prioritized criteria that the calendar owner has established to provide the automatic response.

5. Co-pending application Ser. No. 008,038 filed concurrently herewith, entitled "Electronic Calendaring Method Which Provides for Automatic Assignment of Alternates In Requested Events," and assigned to the assignee of this application is directed to an electronic calendaring method in which a calendar ownere who receives a request to participate in a calendar event originated by another calendar owner, and currently being calendared by that owner, can establish an automatic response which reflects the assignment of an alternate to the event based on the relationship of the information that accompanies the request and criteria that the calendar owner has pre-established for each potential alternate.

BACKGROUND ART

The prior art has disclosed a number and variety of interactive electronic calendaring systems and method. The objective of all of these systems is primarily to assist the person who, for a number of different reasons, maintains a calendar of future events containing various information about the event at entry points on the calendar which relate to the time of the event.

The increase of personal computers and intelligent workstations in recent years has made it possible for calendar owners to establish and maintain their calendars on these interactive type data processing systems.

Two general types of interactive electronic calendaring systems have thus evolved in the art. In one type of calendaring system, the owner of the calendar is generally also the user of the workstation and that workstation is generally not a part of a larger network. Generally, in these types of systems, the calendar functions involve presenting a screen to the user representing a day calendar divided into a number of time periods or time slots.

Each period is capable of displaying a limited amount of text that the user enters. In some systems, the day calendar can scroll vertically to present more time periods to the user or horizontally to present longer text entries. The operator can generally "page" forward or backward and, in most arrangements, can display a requested date. These calendaring arrangements generally do not limit the type of event that is calendared nor the terminology employed at any of the entry points and, to that extent, function in the same manner as conventional manual calendars or appointment books. The electronic calendaring method and systems do have an advantage over the prior art manual calendaring of events in that the user generally has the ability to scan a time span involving a large number of days and identify calendared events quite rapidly.

The other type of calendaring arrangement that has developed in the prior art involves multi-user environments having a large number of terminals or workstations which are generally part of a larger communication network that has been established to permit the users to interact with each other and with data maintained on the data processing system. In this environment, a user at a terminal or workstation can send a message to one or more of the other users on the network and is notified when the addressees has received and read the message.

In most of these environments, each user generally maintains a calendar, and in many of these environments the reason for the interaction with each other quite often generally involves reference to respective calendars. A considerable amount of time is therefore spent in many organizations, with people checking and rearranging their calendars to accommodate various events such as meetings, presentations, etc.

In this environment, the calendar systems and method have progressed to the point where a person who is calling a meeting can at least review within the constraints that the security system dictates, the calendars of other users on the system that he intends to invite to a meeting, to determine whether a given time period is available on the respective calendars of the perspective attendees. However, once the meeting time is set and the prospective participants notified of the date, time, and subject of the meeting, each participant must update his own electronic calendar and reply to the meeting request. While the system can facilitate the request and reply message process, it is sometimes less frustrating when a negative reply has to be transmitted to merely use the telephone to arrive at another mutually convenient time. As a result, a considerable amount of time and effort is spent by calendar owners replying to requests for participation in events that are being calendared by other persons.

The cross referenced applications describe various improvements to electronic calendaring methods for increasing productivity and making the overall system more appealing to the calendar owner by providing functions that the calendar owner came to expect and rely on when his calendar was being kept manually.

In many situations it is desirable that the individual calendar owner have the ability to reserve resources that he intends to use at the event that he is calendaring. While some electronic calendaring systems permit the calendar owner to request a meeting place such as a conference room, the availability of the conference room and the resources associated with the conference room are not provided at the time the event is being calendared. An iterative process therefore results where the meeting time has to be changed because no conference room is available and the one or more of the previous confirmed invitees cannot attend because of a prior commitment. Similar situations arise when for example the meeting originator needs special equipment for the meeting such as a slide projector, a video player and monitor, or tele-conferencing units only to be informed shortly before the meeting that they are broken or not available for a number of valid reasons. The present invention overcomes the above described problems and limitations of prior art electronic calendaring methods by providing a method in which a calendar owner can request resources to support an event that is being calendared at the time the event is being calendared and receive a confirmation at that time that the facilities and resources will be available.

SUMMARY OF THE INVENTION

In order to minimize the time and effort involved by calendar owners in calendaring events that require facilities and recourses, provision is made in the electronic calendaring method for an automatic confirmation of the availability of the requested facilities at the time and place indicated in the meeting notice.

The method establishes a Resource data structure for storing data that is used by the system to automate the response for meeting facilities and equipment to a calendar owner calendaring a meeting and dispatching a meeting notice through the system to other calendar owners. A pair of triplet type data structures are also established for use by the system in connection with the Resource data structure to allow a definition of the meeting place and the equipment that is available at the scheduled meeting time with the requested resources.

The Automatic Response function of the electronic calendaring system that is described in cross-referenced application Ser. No. 008,033 is modified to accommodate the development of an automatic reply from a node on the system which is assigned to the conference room. The caller of the meeting is presented a screen as part of the process of calendaring a meeting type of an event, which permits the caller to identify the conference room that he wants, the time period that it will be in use and the equipment he would like reserved for use at the meeting. The meeting notice is sent to the conference room node prior to or contemporaneously with notices sent to the meeting invitees.

On receipt of the notice at the conference room node the request is analyzed and if the room is available, a confirmation is sent back to the caller advising that the room is reserved for him. The list of requested equipment is also analyzed against available equipment and an indication is provided for each item that it is reserved for that meeting period. An indication is also provided when the item that was requested is not available.

If there are similar meeting rooms in the immediate vicinity of the requested room, an alternate room can be assigned automatically if it meets the request, much like the operation in the cross-referenced application Ser. No. 008,033 which permits an owner to send an alternate to a meeting to which the owner was invited. The caller of the meeting therefore is aware of what room is reserved and whether of not all of the equipment that he will need is reserved.

It is therefore an object of the present invention to provide an improved electronic calendaring method.

A further object of the present invention is to assist owners of electronic calendars in scheduling calendared events which involve facilities and equipment that may not be available at the time of the meeting.

A further object of the present invention is to provide an improved electronic calendaring method in which a reply to a request for use of a common facility and common equipment to support an event being calendared can reflect the fact that a specific requested item is or is not available.

A still further object of the present invention is to provide an electronic calendaring method in which an automatic reply to a calendar owner that has requested equipment or facilities to support a meeting, can specify an alternate location that meets all of the elements of the request or in which the nature and content of the reply reflects that the suggested alternate location comes closer to fulfilling the request than the location originally specified.

Objects and advantages, other than those mentioned above, will become apparent from the following description when read in connection with the drawing.

BRIEF DESCRIPTION OF THE DRAWING

FIGS. 3a–3c illustrate display screens that are employed with the method of the present invention for entering information interactively into the system during the calendaring of an event.

FIGS. 4a–4b illustrate display screens that are employed where a request for a conference room is entered along with a request to reserve specific equipment for the scheduled meeting.

FIG. 5 illustrates a display screen that is employed by the person responsible for conference room scheduling and equipment inventory and automatic replies.

BRIEF DESCRIPTION OF THE PREFERRED EMBODIMENT

Figure 1:
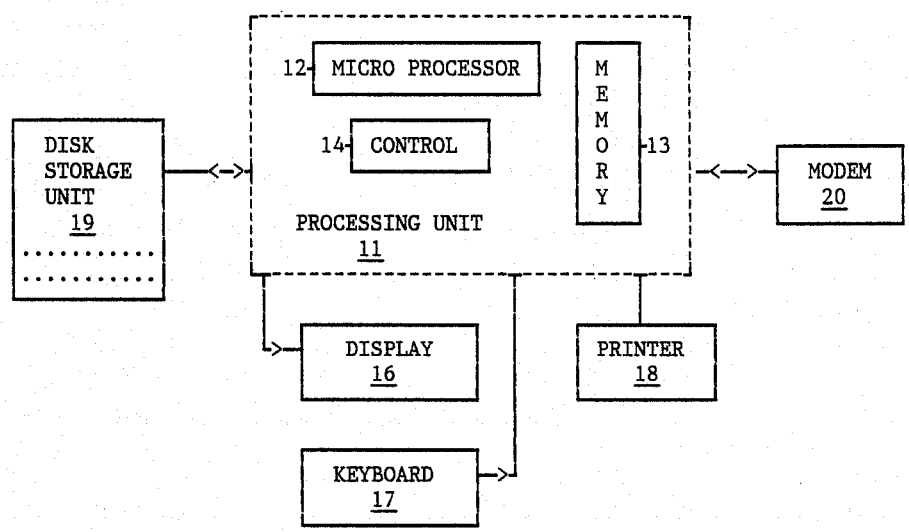
FIG. 1 is a block diagram of an interactive data processing terminal in which the method of the present invention may be advantageously employed.

FIG. 1 illustrates the functional components of an interactive type data processing terminal on which the electronic calendaring method of the present invention may be advantageously employed. The terminal comprises a processing unit 11 which includes a microprocessor block 12, a semiconductor memory 13, and a control block 14 which functions to control input/output operations in addition to the interaction between the micro processor block 12 and the memory unit 13.

The terminal further includes a group of conventional peripheral units including a display device 16, a keyboard 17, a printer 18, a disk storage unit 19, and a modem 20. Since the details of the above described functional blocks form no part of the present invention and can be found in the prior art, only a brief functional description of each block is set forth, along with a description of their interactions, sufficient to provide a person of ordinary skill in the art with a basis of understanding applicants' improved electronic calendaring method.

Processing unit 11 corresponds to the "system unit" of a personal computer system such as the IBM XT or IBM AT type systems. Unit 11 is provided with an operating system program which may be one of the many versions of DOS (Disk Operating System) which is normally employed to run the systems. The operating system program is stored in memory 13 along with one or more application programs that the user has selected to run. Depending on the capacity of memory 13 and the size of the application programs, portions of these programs, as needed, may be transferred to memory 13 from the disk storage unit 19 which may include, for example, a 30 megabyte hard disk drive and a diskette drive. The basic function of the disk storage unit is to store programs and data that are employed by the system and which may readily be transferred to the memory unit 13 when needed. The function of the diskette drive is to provide a removable storage function for entering programs and data into the system, and a vehicle for storing data in a form that is readily transportable for use on other terminals or systems.

Display device 16 and keyboard 17 together provide for the interactive nature of the terminal, in that in normal operation, the interpretation that the system gives to a specific keystroke by the operator depends, in substantially all situations, on what is being displayed to the operator at that point in time.

In some situations, the operator, by entering commands into the system, causes the system to perform a certain function. In other situations, the system requests the entry of certain data, generally by displaying a prompt type of menu/message screen. The depth of the interaction between the operator and the system varies by the type of operating system and the application program, but is a necessary characteristic of terminals on which the method of the present invention may be employed.

The terminal shown in FIG. 1 further includes a printer 18, which functions to provide hard copy output of data developed or stored in the terminal. Lastly, the modem 20 functions to transfer data from the terminal of FIG. 1 to a host system through one or more communication links which may be a commercial type link or a dedicated communication link.

Figure 2:
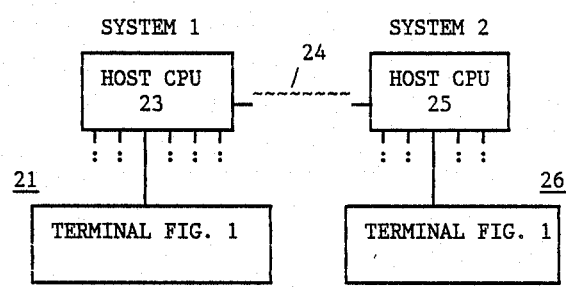
FIG. 2 is a block diagram of the network of terminals of the type shown in FIG. 1.

FIG. 2 illustrates a network 21 of interactive type workstations of the type shown in FIG. 1. As illustrated, the network includes a plurality of terminals which are interconnected with each other and to a host central processing unit 23, which in turn is connected via communication link 24 to a second host processing unit 25, which also connects to another network 26 of interactive workstations. Functionally, the system operates to allow one terminal to communicate to one or more other terminals using established communication protocols, so that the various serially connected communication links are transparent to the operator. Such systems are well known in the art, and are currently in extensive commercial use. Since these communication links per se are not part of the present invention, only those details that are necessary for an understanding of the calendaring method of the present invention will be described. It should therefore be assumed in the following description, that each workstation on the network has a system node address and a "post office" address, and that to simplify the description, there is only one individual assigned to each node on the network. It should further be assumed that conventional communication services are provided by the system, such as directory listings of individual calendar owners and shareable resources such as meeting rooms, etc., which require scheduling.

The system shown in FIG. 2 processes information as various types of data objects such as text data objects, graphic data objects, and calendar data objects. Each of these data objects are represented by a datastream which comprises a series of structured fields.

A calendar object datastream has the following sequence of structures.

---
Begin Document (BDT)
  Begin Page (BPG)
    Begin Calendar Data (BCL)
      Calendar Data Descriptor (CDD) (Optional)
      Calendar Data SF (CAD)
        Calendar Structures (COCA)
    End Calendar Data (ECL)
  End Page (EPG)
End Document (EDT)

---

The format of the datastream for other type data objects contain the begin document, begin page, end page, and end document data structures. Structured fields corresponding to those listed above for a calendar object are also employed for other type objects.

A structured field is a self-describing entity which contains related groupings of parameter values and triplets. The structured field, as shown below, has two parts: the Structured Field Introducer and the Structured Field Content.

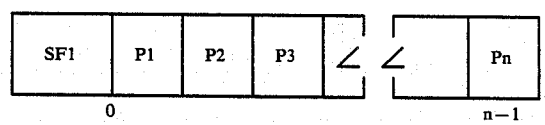

The structured field begins with a Structured Field Introducer. The syntax and semantics of the Structured Field Introducer are defined by the architecture which governs the datastream in which the structured field is found. The Structured Field Introducer contains as the first two bytes a parameter which defines the length of the structured field. It also contains an identification code which uniquely identifies the structured field.

The Structure Content portion of each structured field contains structures and triplets, which give the structured field its meaning. Parameters in the triplets define the attributes of the Calendar Object. Every parameter has a value either explicitly appearing in a triplet, inherited from a control structure in the datastream's hierarchy, or implicitly defined as a default. This default may also be the alternate action value. Every structure is either required or optional. A required structure appears in the object because the function of that structure is required and for proper performance of the function an actual value is necessary.

An optional structure need not appear in the object either because the function of that structure is not required or because the function is required, but default values are acceptable for all parameters.

As shown above, a calendar data (CAD) structured field (SF) precedes the actual calendar data. A calendar data descriptor (CDD) SF can precede the CAD SF to provide formatting information for the data that follows.

Calendar data comprises named data structures and named triplets which are composed of parameters. A parameter is a variable to which a value is assigned. Parameters can be optional or required. Parameters are also classified as terminal or non-terminal. A terminal parameter is merely the last parameter in a string of parameters.

A parameter can have one of three types of values assigned.

1. NUM—This is a number or a numerical value.
2. COD—This is a code assigned a specific meaning.
3. BST—This is a bit string of binary elements, each of which is usually independent of the other.

In the following discussion it will be assumed that a byte comprises 8 bit positions numbered 0–7 from left to right, with position 0 being the high order position. Bit position 0 represents 27 (2 to the 7th power), while bit 7 represents 20 (2 to the 0 power).

The various calendar structured fields and calendar triplets are defined by the following type of table.

| BYTES | NAME | TYPE | MIN | MAX | LGTH | OPT |
|-------|------|------|-----|-----|------|-----|
| n-m   | name | type | v   | x   | www  |     |

In the figure:
BYTES refers to the position, indexed on zero.
NAME is the name by which reference is made to the parameter.
TYPE denotes the syntax of the parameter by "type." The architected types NUM, COD, and BST were described earlier.
LGTH denotes the length of the field in terms of the exact number of bytes or the maximum number of bytes permitted.
OPT refers to the optionality of the parameter's appearance in the structure or triplet:
O means that the parameter is optional.
R means that the parameter's appearance is required.
If a required parameter is missing, an exception condition exists. The alternate action is to ignore the structure, self-defining field, or triplet to which the missing parameter belongs.

Syntactically descriptive material below the figure indicates what additional restrictions apply to the structure or triplet defined by the figure.

Calendar structures and calendar triplets which are relevant to the present invention will be described using the above-described format. After the structures are described, the display screens that are presented to calendar owners by the system in order to solicit information when a calendar owner wants to perform a calendaring function such as reserving a conference room and equipment will be described. A flow chart setting forth the detailed steps of the method of the present invention will then be described and will assist persons skilled in programming interactive terminals to implement the method of the present invention.

Since the Automatic Response function operates in response to an invitation to an event being calendared by another calendar owner, it is necessary to describe in detail the data structures that are employed by the system in the process of an owner calendaring an event on his calendar.

In the preferred embodiment, calendar entries are classified into a number of different types. Since the system contemplates interchanging calendar data throughout the system, including terminals that are remotely connected, such as those shown in FIG. 2, entry types and presentation language are controlled by a defined architecture.

While the same display screen may be employed to solicit the data for a number of different event types, the data structures and triplets, required or optional, will vary by event type.

While some of the structures to be described and the triplets associated with these structures are not directly involved in the "Automatic Response" function, and conference room replies they have been described in order to provide background for the reader and a basis for a comprehensive understanding of the claimed process and its relationship to the processes described and claimed in the cross-referenced application.

The various calendar object data structures to be described are preceded by a calendar data structure shown below.

| CALENDAR DATA (CAD) STRUCTURE FIELD (SF) | | | | | | |
|-------|------|------|------|------|------|-----|
| BYTES | NAME | TYPE | MIN  | MAX  | LGTH | OPT |
| 0-1   | Structured Field Length | NUM | 8 | 32767 | 2 | R |
| 2     | Structured Field Type1 | COD | X'D3' | X'D3' | 1 | R |
| 3     | Structured Field Type2 | COD | X'EE' | X'EE' | 1 | R |
| 4     | Structured Field Type3 | COD | X'5B' | X'5B' | 1 | R |
| 5     | Flags | BST | 0 | 0 | 1 | R |
| 6-7   | Segment Sequence Number | NUM | 0 | 32767 | 2 | R |
| 8-7+n | Calendar Data | | * | * | n | R |

*Values depend on the Calendar Object structure and triplet specification.

The Calendar Data SF (CAD) identifies the data as calendar data and specifies the length of the calendar data. The Calendar Data SF contains, for example, up to 32767 bytes of calendar structures and calendar triplets (called "Calendar Data"). Calendar data varies with the function employed by the generator of the object.

MAJOR CALENDAR STRUCTURES DESCRIPTION

This section describes the major structures that are involved in the present invention. The structures consist of a mixture of calendar triplets. The triplets are described in the Calendar Triplets Description section that follows this section.

The calendar structures are preceded by the Calendar Data structured field (CAD). Parameter values specified by the system can be overridden by parameters specified in calendar data, for example, the Code Page of Symbols for Displaying and Printing Data.

In the structure description, bits are consecutively numbered from left to right starting with zero.

The format for all of the structures is the same. The format is shown below.

| BYTES | NAME | TYPE | MIN | MAX | LGTH | OPT |
|---|---|---|---|---|---|---|
| 0-1 | LENGTH | NUM | | | | R |
| 2-3 | TYPE | COD | | | | R |
| 4-n | TRPLT1 to TRPLTn | | | | | R | where;
LENGTH=A two-byte value of the number of bytes in this structure including byte zero.
TYPE=A two-byte binary number that designates a specific structure function.
TRPLT1 TO TRPLTn=Calendar Structure Triplets.

The length of structures can vary depending on the number of triplets included.

If the length excludes all or part of an optional parameter in a triplet, then the value for that parameter and any parameters that follow are not changed; that is, the LENGTH field is used as specified.

If a structure is invalid or unsupported, an exception is raised.

If the length field excludes a required parameter or triplet, an exception is raised.

If a structure contains an invalid or unsupported parameter or triplet, an exception is raised.

APPOINTMENT (APP) STRUCTURE

The appointment structure is shown below.

| BYTES | NAME | TYPE | MIN | MAX | LGTH | OPT |
|---|---|---|---|---|---|---|
| 0-1 | Structure Length | NUM | * | 32767 | 2 | R |
| 2 | Structure Type1 | COD | X'D3' | X'D3' | 1 | R |
| 3 | Structure Type2 | COD | X'70' | X'70' | 1 | R |
| 4-3+n | Appointment Triplets | | * | * | n | R |

*Values depend on the triplet specification.

The APP structure provides the fields necessary to interchange appointment information, the scheduling of appointments and requests for appointment information.

CALENDAR COMMENTS (CMT) STRUCTURE

The calendar comment structure is shown below.

| BYTES | NAME | TYPE | MIN | MAX | LGTH | OPT |
|---|---|---|---|---|---|---|
| 0-1 | Structure Length | NUM | * | 32767 | 2 | R |
| 2 | Structure Type1 | COD | X'D3' | X'D3' | 1 | R |
| 3 | Structure Type2 | COD | X'75' | X'75' | 1 | R |
| 4-3+n | CMT Triplets | | * | * | n | R |

*Values depend on the triplet specification.

The CMT structure provides the fields necessary to interchange calendar comments. The structure supports calendar comments associated with a date and time and calendar comments not associated with a date and time.

ENTRY SELECT (ENS) STRUCTURE

The ENS structure is shown below.

| BYTES | NAME | TYPE | MIN | MAX | LGTH | OPT |
|---|---|---|---|---|---|---|
| 0-1 | Structure Length | NUM | * | 32767 | 2 | R |
| 2 | Structure Type1 | COD | X'D3' | X'D3' | 1 | R |
| 3 | Structure Type2 | COD | X'7F' | X'7F' | 1 | R |
| 4-3+n | ENS Triplets | | * | * | n | R |

*Values depend on the triplet specification.

The ENS structure supports interchange for entries VACATION, HOLIDAY, OFFSITE and NOT NORMAL WORK HOURS calendar comments.

MEETING (MTG) STRUCTURE

The meeting structure is shown below.

| BYTES | NAME | TYPE | MIN | MAX | LGTH | OPT |
|---|---|---|---|---|---|---|
| 0-1 | Structure Length | NUM | * | 32767 | 2 | R |
| 2 | Structure Type1 | COD | X'D3' | X'D3' | 1 | R |
| 3 | Structure Type2 | COD | X'85' | X'85' | 1 | R |
| 4-3+n | Meeting Triplets | | * | * | n | R |

*Values depend on the triplet specification.

The MTG structure provides the fields necessary to interchange meeting information, the scheduling of meetings and requests for meeting information. It also provides a specific search classification to allow building a composite calendar for a specified list of calendar owners.

NAMES LIST (NML) DATA STRUCTURE

The names list data structure is shown below.

| BYTES | NAME | TYPE | MIN | MAX | LGTH | OPT |
|---|---|---|---|---|---|---|
| 0-1 | Structure Length | NUM | * | 32767 | 2 | R |
| 2 | Structure Type1 | COD | X'D3' | X'D3' | 1 | R |
| 3 | Structure Type2 | COD | X'8A' | X'8A' | 1 | R |
| 4-3+n | NML Triplets | | * | * | n | R |

*Values depend on the triplet specification.

The NML structure provides the fields to support a name, associated addresses and status. The NML may contain a list of items, such as an invitee's list, by concatenating Name (NME), Address (ADR) and User Status (UST) sequences. The list may include one or more than one name and associated information.

TRIGGER (TGR) STRUCTURE

The Trigger structure is shown below.

| BYTES | NAME | TYPE | MIN | MAX | LGTH | OPT |
|---|---|---|---|---|---|---|
| 0-1 | Structure Length | NUM | * | 32767 | 2 | R |
| 2 | Structure Type1 | COD | X'D3' | X'D3' | 1 | R |
| 3 | Structure Type2 | COD | X'8F' | X'8F' | 1 | R |
| 4-3+n | TGR Triplets | | * | * | n | R |

*Values depend on the triplet specification.

The TGR structure specifies a time that a notification will occur and or a process will begin.

VIEW SELECT (VSL) DATA STRUCTURE

The View Select data structure is shown below.

| BYTES | NAME | TYPE | MIN | MAX | LGTH | OPT |
|---|---|---|---|---|---|---|
| 0-1 | Structure Length | NUM | * | 32767 | 2 | R |
| 2 | Structure Type1 | COD | X'D3' | X'D3' | 1 | R |
| 3 | Structure Type2 | COD | X'95' | X'95' | 1 | R |
| 4-3+n | VSL Triplets | | * | * | n | R |

*Values depend on the triplet specification.

The VSL structure provides a way to request calendar views for specific category(s) and timespan(s).

CALENDAR PROFILE (CPL) DATA STRUCTURE

The Calendar Profile data structure is shown below.

| BYTES | NAME | TYPE | MIN | MAX | LGTH | OPT |
|---|---|---|---|---|---|---|
| 0-1 | Structure Length | NUM | * | 32767 | 2 | R |
| 2 | Structure Type1 | COD | X'D3' | X'D3' | 1 | R |
| 3 | Structure Type2 | COD | X'77' | X'77' | 1 | R |
| 4-3+n | Calendar Profile Triplets | | * | * | n | R |

*Values depend on the triplet specification.

The CPL structure provides the fields necessary to interchange calendar profile information. The calendar Profile contains information that describes the associated calendar.

DATE AND TIME MAP (DTM) DATA STRUCTURE

The Date and Time Map data structure is shown below.

| BYTES | NAME | TYPE | MIN | MAX | LGTH | OPT |
|---|---|---|---|---|---|---|
| 0-1 | Structure Length | NUM | * | 32767 | 2 | R |
| 2 | Structure Type1 | COD | X'D3' | X'D3' | 1 | R |
| 3 | Structure Type2 | COD | X'7A' | X'7A' | 1 | R |
| 4-3+n | DTM Triplets | | * | * | n | R |

The DTM structure provides an efficient way to pass date and time slot usage between calendar users. It is used to build a combination (composite) calendar from Date and Time Map responses from several users. It supports the selection of calendar entry category(s) and timespan(s) for the Date and Time Map requests and responses.

AUTO RESPONSE (ARS) DATA STRUCTURE

The Auto Response data structure is shown below.

| BYTES | NAME | TYPE | MIN | MAX | LGTH | OPT |
|---|---|---|---|---|---|---|
| 0-1 | Structure Length | NUM | * | 32767 | 2 | R |
| 2 | Structure Type1 | COD | X'D3' | X'D3' | 1 | R |
| 3 | Structure Type2 | COD | X'72' | X'72' | 1 | R |
| 4-3+n | Auto Response Triplets | | * | * | n | R |

The ARS structure provides the fields necessary to interchange automatic response information. It allows the use of a network address(NAD), A Meeting or Appointment Structure ID (SID), A Priority (UDF) or a User Defined Field (UDF) specification to initiate an automatic response.

RESOURCE (RSR) DATA STRUCTURE

The Resource data structure is shown below.

| BYTES | NAME | TYPE | MIN | MAX | LGTH | OPT |
|---|---|---|---|---|---|---|
| 0-1 | Structure Length | NUM | * | 32767 | 2 | R |
| 2 | Structure Type1 | COD | X'D3' | X'D3' | 1 | R |
| 3 | Structure Type2 | COD | X'78' | X'78' | 1 | R |
| 4-3+n | Resource Triplets | | * | * | n | R |

The RSR structure provides the fields necessary to interchange conference room information. It contains information describing a conference room or conference room equipment.

CALENDAR TRIPLETS DETAIL DESCRIPTION

This section describes in detail the set of calendar triplets that are the building blocks designed to be used by the Calendar Structures of the system including those described in the previous section.

In the triplet descriptions, bits are consecutively numbered from left to right starting with zero.

The format for all of the triplets is the same and is shown below.

| BYTES | NAME | TYPE | MIN | MAX | LGTH | OPT |
|---|---|---|---|---|---|---|
| 0 | LENGTH | NUM | | | | R |
| 1 | KEYWORD | COD | | | | R |
| 2-n | PARM1 to PARMn | | | | | R | where
LENGTH=A one-byte value of the number of bytes in this triplet including byte zero.
KEYWORD=a one-byte binary number that designates a specific triplet function.
PARM1 to PARMn=Parameters containing the triplet settings.

The length of some triplets can vary depending on the number of parameters specified. If the length excludes an optional parameter or part of an optional parameter, then the value for that parameter and any parameters that follow are not changed; that is, the LENGTH field is used as specified. If a triplet is received in which the length exceeds the maximum value required to include all parameters, an exception is raised since the additional values are considered to be unsupported parameters. Also, if the length field excludes a required parameter, an exception is raised.

Since bytes 0 and 1 of all the triplets are identical, they are not shown for each triplet. Only bytes 1 through n will be described.

CAPACITY (CPC) TRIPLET DATA STRUCTURE

The CPC DS is shown below

| BYTES | NAME | TYPE | MIN | MAX | LGTH | OPT |
|---|---|---|---|---|---|---|
| 1 | Keyword | COD | X'17' | X'17' | 1 | R |
| 2 | Capacity | NUM | 1 | 255 | 1 | R |

The CPC triplet specifies the capacity for an associated identified facility.

CPC Parameters

CAPACITY—Specifies the number of persons accommodated.
Values
1-255

RESOURCE TYPE (RST) TRIPLET DATA STRUCTURE

The RST data structure is shown below.

| BYTES | NAME | TYPE | MIN | MAX | LGTH | OPT |
|---|---|---|---|---|---|---|
| 1 | Keyword | COD | X'18' | X'18' | 1 | R |
| 2-3 | Type | BST | | | 2 | R |

The RST triplet specifies the type of resource.

RST Parameter

Type—Specifies a resource type.
Bit
0=Conference Room
1=Projection Screen
2=Movie Projector
3=Slide Projector
4=Video Recorder
5=Television
6=Flip Chart Paper
7=Flip Chart Easel
8=Display Terminal
9=Conference Telephone
10=Telephone
11=Writing Board
12=Overhead Projector
13-31 Reserved

CALENDAR SCOPE (CSC) TRIPLET DATA STRUCTURE

The CSC DS is shown below.

| BYTES | NAME | TYPE | MIN | MAX | LGTH | OPT |
|---|---|---|---|---|---|---|
| 1 | Keyword | COD | X'10' | X'10' | 1 | R |
| 2-3 | Calendar Begin Day | NUM | 1 | 366 | 2 | R |
| 4-5 | Calendar Begin Year | NUM | -32K | 32767 | 2 | R |
| 6-7 | Calendar End Day | NUM | 1 | 366 | 2 | R |
| 8-9 | Calendar End Year | NUM | -32K | 32767 | 2 | R |

The CSC triplet defines the timespan supported by the calendar.

CSC Parameters

CALENDAR BEGIN DAY—The day of the year that the calendar timespan begins.
CALENDAR BEGIN YEAR—This is the begin year for the timespan supported in the calendar.
CALENDAR END DAY—The day of the year that the calendar timespan ends.
CALENDAR END YEAR—This is the end year for the timespan supported in the calendar.

CALENDAR TYPE (CTP) TRIPLET DATA STRUCTURE

The CTP DS is shown below

| BYTES | NAME | TYPE | MIN | MAX | LGTH | OPT |
|---|---|---|---|---|---|---|
| 1 | Keyword | COD | X'15' | X'15' | 1 | R |
| 2 | Type | NUM | 0 | 5 | 1 | R |

The CTP triplet specifies the calendar type. It is only valid when used in the Calendar Profile. It defines how to present an entire calendar.

CTP Parameters

TYPE—Specifies the calendar type such as Gregorian, Julian, Muhammadan, Jewish, Lunar, Shop.

DATA AND TIME (DTT) TRIPLET DATA STRUCTURES

The DTT DS is shown below.

| BYTES | NAME | TYPE | MIN | MAX | LGTH | OPT |
|---|---|---|---|---|---|---|
| 1 | Keyword | COD | X'1A' | X'1A' | 1 | R |
| 2 | Daylight Saving Indicator | NUM | 0 | 1 | 1 | R |
| 3 | Time Zone Indicator | NUM | -23 | 23 | 1 | R |
| 4-5 | Begin Date Day | NUM | 1 | 366 | 2 | R |
| 6-7 | Begin Date Year | NUM | -32K | 32767 | 2 | R |
| 8-9 | Begin Time | NUM | 0 | 86400 | 3 | R |
| 11-12 | End Date | NUM | 1 | 366 | 2 | 0 |

| BYTES | NAME | TYPE | MIN | MAX | LGTH | OPT |
|---|---|---|---|---|---|---|
| 13–14 | Day End Date Year | NUM | −32K | 32767 | 2 | 0 |
| 15–17 | End Time | NUM | 0 | 86400 | 3 | 0 |
| 18–254 | Additional Date/Time Combinations | | | | | |

The DTT triplet specifies the dates and times for the associated triplets in the calendar structure.

DTT Parameters

DAYLIGHT SAVINGS INDICATOR—Specifies Daylight Savings Time is active. This parameter, in conjunction with the Time Zone, identifies the time zone and allows the correct time zone label (i.e., CST or CDT) to be applied to the time.

TIME ZONE INDICATOR—The Time Zone Indicator is the displacement from Greenwich Mean Time (GMT) for the time specified. Values are specified in half hours from GMT to handle half-hour zones.

BEGIN DATE DAY—The day of the year when the event begins.

BEGIN DATE YEAR—The year the event begins.

BEGIN TIME—Begin Time specifies the event start time in seconds.

END DATE DAY—The day of the year when the event ends.

END DATE YEAR—The year the event ends.

END TIME—End Time specifies the event stop time in seconds.

Date is specified as a combination of two, two byte parameters (day of the year and year). Time is local time in seconds beginning at midnight. One Begin Date and Begin Time is required in each DTT triplet. The Begin and End, Date and Time sequence may be repeated if additional begin and end date and being and end times are needed.

If more dates and times than can be sent in one DTT triplet are needed, additional DTT triplets can be included in the Calendar Structure. The only restriction is the byte structure length.

DETAIL (DTL) DATA STRUCTURE

The DTL DS is as follows.

| BYTES | NAME | TYPE | MIN | MAX | LGTH | OPT |
|---|---|---|---|---|---|---|
| 1 | Keyword | COD | X'1F' | X'1F' | 1 | R |
| 2–1+n | Character String | COD | * | * | n | R |

The DTL triplet contains character data in the active or selected code page.

DTL Parameters

CHARACTER STRING—Text information associated with a calendar entry.

If the CGCSGID (SCG) is changed in a character string, the DTL triplet must be ended and another one built.

ENTRY CATEGORY (ECT) DATA STRUCTURE

The ECT DS is shown below.

| BYTES | NAME | TYPE | MIN | MAX | LGTH | OPT |
|---|---|---|---|---|---|---|
| 1 | Keyword | COD | X'25' | X'25' | 1 | R |
| 2–5 | Category | BST | | | 4 | R |

The ECT triplet provides a specific category for unavailable time and for open time on a calendar. The ECT triplet is used to specify calendar entry category(s) in requests and replies for both the Date and Time Map (DTM) and the View Select (VSL) structures.

ECT Parameter

CATEGORY—A four byte, bit encoded value. Combinations of more than one category bit are allowed. The categories provide both request and response categories for both Date and Time Map (DTM) and View Select (VSL) calendar structures. Bits 0 through 20 may be used for both DTM and VSL categories. Bits 21 through 24 are used in View Select only. If they are used in a Date and Time Map, they are ignored.

BIT SIGNIFICANCE ENCODING

0 = Holiday (General)—The owner will work on this holiday.

1 = Holiday (Confirmed)—The confirmed calendar owner holiday.

2 = Holiday (Tentative)—A tentative calendar owner holiday.

3 = Vacation (Confirmed)—Confirmed calendar owner vacation.

4 = Vacation (Tentative)—Tentative calendar owner vacation.

5 = Offsite (Confirmed)—The calendar owner will not be at the normal work location and will not be available.

6 = Offsite (Tentative)—The calendar owner has tentatively scheduled an activity away from the normal work location.

7 = Not Normal Work Hours—Categorizes hours that are not normally worked.

8 = Confirmed Meetings (Not Attended)—The calendar owner will not attend.

9 = Confirmed Meetings (Attended)—The calendar owner will attend.

10 = Confirmed Meetings (May Attend)—The calendar owner's status for this meeting is tentative.

11 = Tentative Meetings (Not Attended)—The calendar owner will not attend.

12 = Tentative Meetings (Attended)—The calendar owner will attend this meeting if it becomes confirmed.

13 = Tentative Meetings (May Attend)—The calendar owner's status for this meeting is tentative.

14 = Confirmed Appointments (Not Attended)—The calendar owner will not attend.

15 = Confirmed Appointments (Attended)—The calendar owner will attend.

16 = Confirmed Appointments (May Attend)—The calendar owner's status for this appointment is tentative.

17 = Tentative Appointments (Not Attended)—The calendar owner will not attend.

18 = Tentative Appointments (Attended)—The calendar owner will attend this appointment if it becomes confirmed.

19=Tentative Appointments (May Attend)—The calendar owner's status for this appointment is tentative.
20=Non-Scheduled Time—Identifies open time on the calendar. This category is most effective if used alone.
21=Date and Time Only (VIEW SELECT ONLY)—Selects date and time for all categories not specifically requested in a View Select.
22=Private Entry (VIEW SELECT ONLY)—Only date and time may be provided in the response to a calendar View Select request.
23=Calendar Comments (VIEW SELECT ONLY)—Character data entries.
24=Triggers (VIEW SELECT ONLY)—Entries that start a process and/or notify.
25-31=Reserved If all Category bits are set to one in a request for a Date and Time Map, the information returned is meaningless because it includes both scheduled and non-scheduled time. The "NonScheduled Time" bit should be used carefully if it is used with other bits to obtain meaningful data. The "Not Normal Work Hours" bit should also be used carefully for similar reasons.

ENTRY CLASSIFICATION (ENC) DATA STRUCTURES

The ENC DS is as follows

| BYTES | NAME | TYPE | MIN | MAX | LGTH | OPT |
|---|---|---|---|---|---|---|
| 1 | Keyword | COD | X'2A' | X'2A' | 1 | R |
| 2-3 | Classification | BST | | | 2 | R |

The ENC triplet provides a specific Classification code for a calendar entry that occupies a block of time.

ENC Parameters

CLASSIFICATION—A two byte bit encoded value. Combinations of more than one Classification Bit are not allowed.

BIT SIGNIFICANCE ENCODING

0=Holiday—(General) The owner will work on this holiday.
1=Holiday—(Confirmed) A confirmed calendar owner holiday.
2=Holiday—(Tentative) A tentative calendar owner holiday.
3=Vacation—(Confirmed) Confirmed calendar owner vacation.
4=Vacation—(Tentative) Tentative calendar owner vacation.
5=Offsite—(Confirmed) The calendar owner will not be at the normal work location and will not be available.
6=Offsite—(Tentative) The calendar owner has tentatively scheduled an activity away from the normal work location.
7=Not Normal Work Hours—Identifies times that the calendar owner is normally not at work.

ENTRY SECURITY LEVEL (ESL) STRUCTURE

The ESL DS is as follows

| BYTES | NAME | TYPE | MIN | MAX | LGTH | OPT |
|---|---|---|---|---|---|---|
| 1 | Keyword | COD | X'2F' | X'2F' | 1 | R |
| 2 | Security | NUM | | | 1 | R |

The ESL triplet controls the view access for calendar entries. It is supplied by the calendar owner.

ESL Parameter

SECURITY—A one byte value from 0 to 2.
0=Public (DEFAULT) The calendar may be viewed by any calendar user
1=Shared—The calendar may be shared by a selected group.
2=Private—Date and Time can be viewed but not associated calendar data.

ERROR ACTION (EAC) DATA STRUCTURE

The EAC DS is as follows.

| BYTES | NAME | TYPE | MIN | MAX | LGTH | OPT |
|---|---|---|---|---|---|---|
| 1 | Keyword | COD | X'35' | X'35' | 1 | R |
| 2 | Action | BST | | | 1 | R |

The EAC triplet specifies the action required when an exception is processed.

EAC Parameter

ACTION—The error action specification.

BIT SIGNIFICANCE ENCODING

BIT

0=0—(DEFAULT) Report the exception, take the specified alternate action and continue.
0 1—Ignore the exception, take the specified alternate action and continue.
1-7 Reserved.

EVENT STATUS (EVS) DATA STRUCTURE

The EVS DS is as follows.

| BYTES | NAME | TYPE | MIN | MAX | LGTH | OPT |
|---|---|---|---|---|---|---|
| 1 | Keyword | COD | X'3A' | X'3A' | 1 | R |
| 2 | Event Status | BST | | | 1 | R |

The EVS triplet provides status for an event such as an appointment or meeting.

EVS Parameter

EVENT STATUS—The status of an event.

BIT SIGNIFICANCE ENCODING

0=Confirmed (the meeting time has been established)
1=Tentative (the meeting is tentative)
2=Cancelled (the meeting was cancelled)
3=Postponed (the new date and time are not set)
4=Rescheduled (the meeting has been rescheduled)
5=Marked for Archive (entry will be saved for reference)

NAME (NME) DATA STRUCTURE

The NME DS is as follows.

| BYTES | NAME | TYPE | MIN | MAX | LGTH | OPT |
|---|---|---|---|---|---|---|
| 1 | Keyword | COD | X'3F' | X'3F' | 1 | R |
| 2 | Name Type | BST | | | 1 | R |
| 3 | Associated Triplets | BST | * | * | 1 | R |
| 4-n | Item Name | COD | * | * | 1-251 | R |

The NME triplet specifies a name of either a person or a calendar.

NME Parameters

NAME TYPE—Specifies the name type. Bits 1 and 2 are mutually exclusive. Only one of these bits may be set to 1.

BIT SIGNIFICANCE ENCODING

0=(0- Name is a personal name).
(1- Name is a calendar name).
1=1- Name is a primitive name not unique in a network
2=1- Name is a descriptive name unique in a network).
3-7=Reserved
ASSOCIATED TRIPLETS—Bits set to 1 specify that User Status (UST), Network Address (NAD) and Postal Address (PAD) triplets may follow the NME triplet in any order.
0=A User Status (UST) triplet follows that specifies the named items role and status.
1=An Network Address (NAD) triplet follows that specifies the named item's network address(s).
2=A Postal Address (PAD) triplet follows that specifies the named item's postal address(s)
ITEM NAME—Specifies the name of a person or calendar. Values are valid characters in the active or selected code page. The maximum name size is 251 bytes.

The item named by the NME triplet may be further identified using the User Status (UST), the Postal Address (PAD) and the Network Address (NAD) triplets.

The NME triplet must be preceded with an SCG triplet if the characters used are not on the active code page.

NAMES LIST TYPE (NLT) DATA STRUCTURE

The NLT DS is as follows.

| BYTES | NAME | TYPE | MIN | MAX | LGTH | OPT |
|---|---|---|---|---|---|---|
| 1 | Keyword | COD | X'45' | X'45' | 1 | R |
| 2-3 | List Type | BST | | | 2 | R |

The NLT triplet specifies the type of data contained in a list.

NLT Parameter

LIST TYPE—Specifies the list type. Combinations of bits are allowed. and/or mail addresses.

BIT SIGNIFICANCE ENCODING

0=The list contains names and associated Network Addresses.
1=The list contains Nicknames and associated network addresses.
2-15 Reserved.

The lists may optionally contain postal addresses and user status. The NLT triplet describes the list contents for specific list types. Lists containing the NLT are constrained to the specified contents. If the NLT is omitted the lists may contain any valid combination of names, user status and addresses.

NETWORK ADDRESS (NAD) TRIPLET DATA STRUCTURE

The NAD triplet data structure is shown below.

| BYTES | NAME | TYPE | MIN | MAX | LGTH | OPT |
|---|---|---|---|---|---|---|
| 1 | Keyword | COD | X'4A' | X'4A' | 1 | R |
| 2-n | Network Address | COD | * | * | 16 | O |

The NAD triplet provides the Network Address for the item named in the (NME) triplet.

The NAD Parameters include,
NETWORK ADDRESS—This is the person's Network Address.
Bytes 2 through 9=USER ID
BYTES 10 through 17=NODE ID

PLACE (PLC) DATA STRUCTURE

The PLC DS is as follows:

| BYTES | NAME | TYPE | MIN | MAX | LGTH | OPT |
|---|---|---|---|---|---|---|
| 1 | | COD | X'4F' | X'4F' | 1 | R |
| 2-n | Location | COD | * | * | 1-251 | R |

The PLC triplet specifies a location for an event such as a meeting or appointment. The location is described using text characters. The maximum location length is limited to 253 text bytes.

PLC Parameters

LOCATION—Location specifies the event location.

POSTAL ADDRESS (PAD) TRIPLET DATA STRUCTURE

The PAD triplet data structure is shown below.

| BYTES | NAME | TYPE | MIN | MAX | LGTH | OPT |
|---|---|---|---|---|---|---|
| 1 | Keyword | COD | X'55' | X'55' | 1 | R |
| 2-n | Postal Address | COD | * | * | 1-253 | R |

The PAD triplet provides the Postal Address for the item named in the (NME) triplet.

The PAD Parameters include,
POSTAL ADDRESS—This is the person's Postal Address. Valid values are valid characters in the active or selected code page.

PROCESS ID (PRD) TRIPLET DATA STRUCTURE

The PRD triplet data structure is shown below.

| BYTES | NAME | TYPE | MIN | MAX | LGTH | OPT |
|---|---|---|---|---|---|---|
| 1 | Keyword | COD | X'5A' | X'5A' | 1 | R |
| 2-n | Process | COD | * | * | 1-16 | R |

The PRD triplet specifies the ID of a process such as a computer program.

PRD Parameter

PROCESS—A 1 to 16 byte identifier. Valid values are valid characters in the active or selected code page.

RESPONSE (RSP) DATA STRUCTURE

The RSP DS is as follows:

| BYTES | NAME | TYPE | MIN | MAX | LGTH | OPT |
|---|---|---|---|---|---|---|
| 1 | Keyword | COD | X'5C' | X'5C' | 1 | R |
| 2 | Response | BST | | | 1 | R |

The RSP triplet establishes a response that will be sent automatically as part of the AUTO RESPONSE data structure.

RSP Parameter

RESPONSE—Specifies what response will be sent. The Alternate indication may use any other bit

BIT SIGNIFICANCE ENCODING

0=No Action—Auto response is deactivated.
1=Confirmed—The invitee will attend.
2=Tentative—The invitee may attend.
3=Not Attending—The invitee will not attend.
4=User Acknowledge—The schedule request was received.
5=Alternate—The response is from the invitee's alternate.

RSVP (RVP) DATA STRUCTURE

The RVP DS is as follows:

| BYTES | NAME | TYPE | MIN | MAX | LGTH | OPT |
|---|---|---|---|---|---|---|
| 1 | Keyword | COD | X'5F' | X'5F' | 1 | R |
| 2 | RSVP | BST | | | 1 | R |

The RVP triplet indicates that an attendance response is required.

RVP Parameter

RSVP—Specifies the need for a response to a meeting schedule request.

BIT SIGNIFICANCE ENCODING

0=No attendance response is required.
1=An attendance response is required using the NML structure.

SET CODED GRAPHIC CHARACTER SET GLOBAL ID (SCG) DATA STRUCTURE

The SCG DS is as follows:

| BYTES | NAME | TYPE | MIN | MAX | LGTH | OPT |
|---|---|---|---|---|---|---|
| 1 | Keyword | COD | X'65' | X'65' | 1 | R |
| 2-3 | GCSGID | NUM | 1 | 65534 | 2 | R |
| 4-5 | CPGID | NUM | 1 | 65534 | 2 | R |

The SCG triplet specifies the coded graphic character set global identification that is used to map subsequent text into presentable graphics.

The CGCSGID that is specified by the system selects the active Character Set and Code Page. If the CGCSGID is not specified the default Character Set and Code Page specified are used.

SCG Parameters

CGCSGID—Coded Graphic Character Set Global ID; a concatenation of 2 two-byte numbers. The first two bytes identify the Graphic Character Set Global ID (GCSGID) expressed as a binary value. The second two bytes identify the Code Page Global ID (CPGID) expressed as a binary value.
GCSGID—Graphic Character Set Global ID.
CPGID—Code Page Global ID.
GCSGID and CPGID are used to determine how coded text characters are translated to the graphic characters to be presented.

The SCG will only select a code page for the triplet that immediately follows it. If structures containing text characters on a code page that is different from the default code page are concatenated, a separate SCG is required preceding each structure.

The SCG has no affect on the NETWORK ADDRESS in the UDF triplet and the USER CODE in the UDF triplet.

STRUCTURE ID (SID) DATA STRUCTURE

The SID DS is as follows:

| BYTES | NAME | TYPE | MIN | MAX | LGTH | OPT |
|---|---|---|---|---|---|---|
| 1 | Keyword | COD | X' ' | X' ' | 1 | R |
| 2 | ID Type | BST | | | 1 | R |
| 3-n | Identifier | COD | * | * | n | R |

The SID triplet provides an identifier for calendar structures.

SID Parameters

ID TYPE—Specifies the ID type

BIT SIGNIFICANCE ENCODING

0=Entry ID—Identifies a calendar entry
1=Names List ID—Identifies a list of names
2=Trigger ID—Identifies a trigger
3=Profile ID—Identifies a calendar profile
4=Auto Response—Identifies an automatic response
5=Resource—Identifies a Resource data structure
IDENTIFIER—1 to 44 character identifier.

The SID provides a correlation ID to accomplish calendar updates from an intelligent workstation to a host, to correlate responses to a meeting notice with the meeting names list and to correlate notification of a list of people associated with a meeting or a list.

SUBJECT (SBJ) DATA STRUCTURE

The SBJ DS is as follows:

| BYTES | NAME | TYPE | MIN | MAX | LGTH | OPT |
|---|---|---|---|---|---|---|
| 1 | Keyword | COD | X'6F' | X'6F' | 1 | R |
| 2-n | Event Subject | COD | * | * | 1-253 | R |

The SBJ triplet specifies the subject for an event. The subject is described using text character.

SBJ Parameters

EVENT SUBJECT—This parameter specifies the event subject.

Trigger Type (TTP) DATA STRUCTURE

The TTP DS is as follows:

| BYTES | NAME | TYPE | MIN | MAX | LGTH | OPT |
|---|---|---|---|---|---|---|
| 1 | Keyword | COD | X'7F' | X'7F' | 1 | R |
| 2-n | Type | BST | * | * | 1 | R |

The TTP triplet provides a trigger type for use in the Trigger (TGR) structure. The type may be used to activate the correct support program when a trigger structure is processed.

TTP Parameters

TYPE—This parameter specifies whether the type is a message, audio tone process or a combination trigger.
Bit
0=Message Trigger (Default)
1=Audio Trigger
2=Process Trigger—The process is identified by the Process ID will be started.
3-7=Reserved

TIME MAP (TMA) DATA STRUCTURE

The TMA DS is as follows:

| BYTES | NAME | TYPE | MIN | MAX | LGTH | OPT |
|---|---|---|---|---|---|---|
| 1 | Keyword | COD | X'75' | X'75' | 1 | R |
| 2-4 | Time Scale | NUM | 1 | 86400 | 2 | R |
| 5-n | Time Byte(s) | BST | | | 1-250 | R |

The TMA triplet provides the time scale and the bit map representation of the selected time scale. The TMA is used in the DATE and TIME MAP data structure.

TMA Parameters

Time Scale—The time scale is the time increment represented by each bit in the Time Byte(s). Values allowed are 1 to 86400 seconds.

Time Byte(s)—Each bit location in the Time Byte represents a time span equal to the Time Scale. Bit zero represents the timespan beginning at the Begin Time.

TIME STAMP (TMS) DATA STRUCTURE

The TMS DS is as follows.

| BYTES | NAME | TYPE | MIN | MAX | LGTH | OPT |
|---|---|---|---|---|---|---|
| 1 | Keyword | COD | X'7A' | X'7A' | 1 | R |
| 2 | Daylight Savings Indicator | NUM | 0 | 1 | 1 | R |
| 3 | Time Zone Indicator | NUM | −23 | 23 | 1 | R |
| 4-5 | Begin Date Day | NUM | 1 | 366 | 2 | R |
| 6-7 | Begin Date Year | NUM | −32K | 32767 | 2 | R |
| 8-10 | Begin Time | NUM | 0 | 86400 | 3 | R |
| 11 | Network Address Length | NUM | 0 | 128 | 1 | O |
| 12-n | Network Address | COD | | | 1-128 | O |

The TMS triplet specifies an entry's time zone, creation date and time and the entry creator's network address.

TMS Parameters

DAYLIGHT SAVINGS INDICATOR—Specifies Daylight Savings Time is active. This parameter, in conjunction with the Time Zone, identifies the time zone and allows the correct time zone label (i.e.,. CST or CDT) to be applied to the time.

TIME ZONE INDICATOR—The Time Zone Indicator is the displacement from Greenwich Mean Time (GMT) for the time specified. Values are specified in half hours from GMT to handle half hour zones.

BEGIN DATE YEAR—The year the event begins.

BEGIN TIME—Begin Time specifies the event start time.

NETWORK ADDRESS LENGTH—The Network Address length

NETWORK ADDRESS—System address
  Bytes 12 thru 19=USER ID—valid characters in CP256, CS930.
  Bytes 20 thru 27=NODE ID—valid characters in CP256, CS930.
  Bytes 28 thru 139=Reserved to support additional address.

USER STATUS (UST) DATA STRUCTURE

The UST DS is as follows:

| BYTES | NAME | TYPE | MIN | MAX | LGTH | OPT |
|---|---|---|---|---|---|---|
| 1 | Keyword | COD | X'8A' | X'8A' | 1 | R |
| 2 | Role | COD | 0 | 7 | 1 | R |
| 3 | Personal Status | COD | 0 | 5 | 1 | R |

The UST triplet provides information regarding the person named in the Name (NME) triplet. It provides the named persons Role and Personal Status.

UST Parameters

ROLE—Specifies the persons role regarding the event.

VALUES

0=Caller—Person has called the event.
1=Arranger—Person is arranging the event.
2=Invitee (Default)—Person has been invited to the event.
3=Mandatory Invitee—Person who must attend the meeting.
4=Alternate—Person replacing an invitee for attendance consideration on a temporary basis.
5=Additional Attendee—Person who is adding themselves to the distribution list associated with a group meeting.
6=Receives Copy—Person who receives event information.
7=Receives Blind Copy—Person who receives event information only, whose name will not appear on the distribution list.
8=Permanent Alternate—Person replacing the invitee for attendance on a permanent basis.

PERSONAL STATUS—The status associated with the name.

VALUES

0=No Action (no status has been received)
1=Confirmed (the person will attend)
2=Tentative (the person might attend)
3=Not Attending (the person will not attend)
4=User Acknowledge (received the invitation)
5=Alternate (the invitee will not attend, but an alternate may)

USER DEFINED FIELD (UDF) DATA STRUCTURE

The UDF DS is as follows:

| BYTES | NAME | TYPE | MIN | MAX | LGTH | OPT |
|---|---|---|---|---|---|---|
| 1 | Keyword | COD | X'85' | X'85' | 1 | R |
| 2 | Priority | NUM | 1 | 10 | 1 | R |
| 2-9 | User Code | COD | * | * | 1-8 | R |

The UDF triplet provides a priority and user defined field that is assigned by the calendar owner. The assigned code provides additional entry categories.

UDF Parameters

PRIORITY—A one byte field that specifies a priority value for a calendar entry. 1 is the highest and 10 is the lowest priority.
USER CODE—An eight byte user defined code.

WORK TIMES (WTM) DATA STRUCTURE

The WTM DS is as follows:

| BYTES | NAME | TYPE | MIN | MAX | LGTH | OPT |
|---|---|---|---|---|---|---|
| 1 | Keyword | COD | X'8F' | X'8F' | 1 | R |
| 2 | Daylight Savings Indicator | NUM | 0 | 1 | 1 | R |
| 3 | Time Zone Indicator | NUM | −23 | 23 | 1 | R |
| 4-6 | Begin Time | NUM | 0 | 86400 | 3 | R |
| 7-9 | End Time | NUM | 0 | 86400 | 3 | R |
| 10-254 | Additional Begin/End Time Combinations | | | | | |

The WTM triplet specifies the work times for an associated calendar. Time is local time in seconds beginning at midnight.

WTM Parameters

DAYLIGHT SAVINGS INDICATOR—Specifies Daylight Savings Time is active. This parameter, in conjunction with the Time Zone, identifies the time zone and allows the correct time zone label (i.e., CST or CDT) to be applied to the time.

TIME ZONE INDICATOR—The Time Zone Indicator is the displacement from Greenwich Mean Time (GMT) for the time specified. Values are specified in half hours from GMT to handle half hour zones.
BEGIN TIME—Begin Time specifies the time block begin in seconds.
END TIME—End Time specifies the time block end in seconds.

One Begin Time and End Time is required in each WTM triplet. The Begin and End Time sequence may be repeated if additional begin and end times are needed.

WORK WEEK PATTERN (WWP) DATA STRUCTURE

The WWP Data Structure is as follows

| BYTES | NAME | TYPE | MIN | MAX | LGTH | OPT |
|---|---|---|---|---|---|---|
| 1 | Keyword | COD | X'95' | X'95' | 1 | R |
| 2 | Pattern | BST | * | * | 1 | R |

The WWP triplet specifies which days of the week are work days. Each bit that is on specifies that the day is a work day.

WWP Parameters

PATTERN—This parameter specifies days of the week.
0=Sunday
1=Monday
2=Tuesday
3=Wednesday
4=Thursday
5=Friday
6=Saturday
7=Reserved Table 1 summarizes the relationships of the triplets to the major Data structures. In the table the letter 'O' indicates that the triplet is optional for that data structure, the letter 'R' indicates that the triplet is Required for the data structure and the designation '-' indicates that the triplet in not applicable to the data structure.

TABLE 1

| MAJOR STRUCTURES → | | APT | CMT | ENS | MTG | NML | TGR | VSL | CPL | DTM | ABS | RSR |
|---|---|---|---|---|---|---|---|---|---|---|---|---|
| TRIPLETS ↓ | | | | | | | | | | | | |
| Capacity | CPC | — | — | — | — | — | — | — | — | — | — | O |
| Calendar Scope | CSC | — | — | — | — | — | — | O | — | — | — | — |
| Calendar Type | CTP | — | — | — | — | — | — | O | — | — | — | — |
| Date and Time | DTT | R | O | R | R | R | R | O | — | R | — | R |
| Detail | DTL | O | O | O | O | O | O | — | — | — | — | O |
| Entry Category | ECT | — | — | — | — | — | — | O | — | O | — | — |
| Entry Class | ENC | — | — | R | — | — | — | — | — | — | — | — |
| Entry Security | ESL | O | O | O | O | O | O | — | O | — | O | — |
| Error Action | EAC | O | O | O | O | O | O | O | O | O | O | O |
| Event Status | EVS | O | — | — | O | — | — | — | — | — | — | — |
| Name | NME | O | — | — | O | O | — | — | O | — | O | O |
| Names List Type | NLT | — | — | — | — | O | — | — | — | — | — | — |
| Network Address | NAD | O | — | — | O | O | — | — | O | — | O | O |

TABLE 1-continued

| MAJOR STRUCTURES | → | APT | CMT | ENS | MTG | NML | TGR | VSL | CPL | DTM | ABS | RSR |
|---|---|---|---|---|---|---|---|---|---|---|---|---|
| Place | PLC | O | — | — | O | — | — | — | — | — | — | — |
| Postal Address | PAD | O | — | — | O | O | — | — | O | — | O | O |
| Process ID | PRD | — | — | — | — | — | O | — | — | — | — | — |
| Resource Type | RST | — | — | — | — | — | — | — | — | — | — | R |
| Response | RSP | — | — | — | — | — | — | — | — | — | R | — |
| RSVP | RVP | — | — | — | O | — | — | — | — | — | R | — |
| Set Char. Set | SCG | O | O | O | O | O | O | — | O | — | O | O |
| Structure Id | SID | R | R | R | R | R | R | — | R | R | R | R |
| Subject | SUB | O | — | — | O | O | — | — | — | — | — | — |
| Trigger Type | TTP | — | — | — | — | — | R | — | — | — | — | — |
| Time Map | TMA | — | — | — | — | — | — | — | — | O | — | — |
| Time Stamp | TMS | O | O | O | O | O | O | — | O | — | O | O |
| User Status | UST | O | — | — | O | O | — | — | — | — | O | — |
| User Defined Fld | UDF | O | O | O | O | — | — | — | — | — | O | — |
| Work Time | WTM | — | — | — | — | — | — | — | O | — | — | — |
| Work Week | WWP | — | — | — | — | — | — | — | O | — | — | — |

THE PROCESS OF CALENDARING EVENT

FIG. 3a is a screen that is displayed to the operator/calendar owner in response to the operator indicating to the system that he wants to calendar an event. This can be accomplished, for example, by selecting item 1 from the master menu shown in FIG. 3a. Assume that a meeting is scheduled at 10 a.m. on Thursday, Oct. 7, 1986, and that the notice for the meeting is to be issued through the electronic calendaring system. The owner then enters the information into the system, employing the screens of FIGS. 3b and 3c. To identify the event type after selecting option 1 on screen 3b, the operator merely presses the enter key since the cursor has automatically been positioned at the event e.g., "Meeting" on the screen of FIG. 3b. The next data entry as shown involves assigning a priority to this event. The valued to be entered is a value from 1–10 as indicated on the line following the blank for the value. The function of the priority number is to establish the relative importance of this event when viewed with regard to other commitments which are either planned or anticipated. This entry of a priority value is optional since the system will establish a default priority for the event according to some predetermined criteria which has been established for all calendar owners or alternately which gives a unique default for each specific individual.

The assignment of a priority value to a calendar event either explicitly by the calendar owner or implicitly by the system is a necessary step in the view select process implementing in accordance with the method described and claimed in cross reference application Ser. No. 008,034. The function of the priority value is described in detail in that application.

The user defined field, as shown in FIG. 3b is not used in the present example. Its function is to provide a field which the user or the user community can employ for some predefined purpose. The event identifier is the official name of the meeting. The date and time of the meeting are entered next.

The next entry on the screen is the names list. All the persons that are invited to attend the meeting have been listed in a names list along with their user ID, network and/or postal addresses and that list is assigned a name. The information is stored in the Names List data structure described earlier so that in the case of regularly scheduled meetings, the meeting caller only needs to identify the name of the names list.

As background to an understanding of the method for providing an automatic response to a request for a conference room and equipment, the process for developing an automatic response by a calendar owner that is described and claimed in cross-referenced Ser. No. 008,033 will be summarized.

If the invitee/owner has not established an automatic response for a meeting notice, then the response must be entered manually. Any of the prior art methods for manually responding to a meeting notice by the invitee may be employed. For example, the screen employed for calendaring an event or one similar to that screen, may be presented to the invitee with the program function key programmed to enter the invitees' response. Alternately a special screen can be presented providing a response field for the event. The response that is entered is stored in the personal status field of the user status triplet that is associated with the invitees' name in the names list. That data structure is returned to the meeting caller and stored in the names list data structure for the identified meeting.

It should be assumed in the following discussion that a calendar owner has decided for a number of reasons that invitations or requests for involvement in events being calendared by selected calendar owners or selected meetings and appointments or other criteria are to be responded to automatically. In order to establish automatic responses, the calendar owner selects item 5 from the master menu shown in FIG. 3a. The auto response screen, shown in FIG. 5, is then presented. If the invitee decides that he will always attend the meetings that are identified by "D35 Meeting A1" then that ID is entered on the line in FIG. 5 following the legend Meeting Name.

The invitee also enters the response that he wants sent which, in accordance with the initial assumption, is that he will always attend. The data that is entered into the system interactively when the auto-response screen is being displayed is stored in the Automatic Response data structure ARS previously described. By pressing program function key PF12 a second set of data for an automatic response can be entered. The system is designed to accommodate a reasonable number of criteria sets. Entry of more than one criteria in FIG. 5 is interpreted by the system as a "logical and" situation in that a notice must contain all the criteria that was entered on the one screen before the response will be automatically dispatch.

The system is arranged so that the host maintains each calendar owner's calendar so that when the owner's workstation is not turned on, his calendar is still available to the other individuals on the system. When a meeting notice is sent to the invitee, the system first checks to see if that invitee/owner has established any automatic response entries. If the system finds that automatic response structures exist, than a comparison is made between the data contained in the meeting notice and the data entered as criteria in the auto-response data structure. Specifically, the meeting name i.e., the event identifier for the meeting notice, is compared against the data entered in the ARS data structure in the identifier field of the SID triplet. In a similar manner, the user status triplet associated with the names list identifies the meeting caller by the placement of a 0 in the Role field of that triplet. The name of the meeting caller is then compared against the name and user status triplet associated with the ARS data structure, this name having been previously stored in this data structure when the invitee was entering criteria in the Automatic Response frame. When the comparison operation indicates a match, then the response stored in the personal status field of the User Status data structure associated with the ARS structure is sent to the meeting caller automatically.

The process of developing an automatic response to a request for a conference room and equipment will now be described.

The meeting caller selects option 6 on the master menu shown in FIG. 3a which results in the conference room screen shown in FIG. 4a being displayed. The meeting caller selects one of the rooms by keying in the appropriate name. The screen of FIG. 4b is then displayed which shows all of the details of the room along with the equipment that is available for use in that room. The two monthly calendars in FIG. 4b show days where there is at least one meeting scheduled for that conference room. The network address of the conference room is also shown. If desired the caller may also enter a date and key PF4 to see the times that have been reserved for that conference room on the indicated date. Otherwise the date and time of the meeting listed on the meeting notice is employed.

The meeting caller specifics the equipment that he would like to have available for the meeting by inserting an 'X' in the blank in front of the item in the equipment list on FIG. 4b. After all the data is entered the calendar owner presses the PF9 key and the data is stored in data structures that are sent to the Conference Room node by the system in the same manner that notices are sent to the calendar owners that are being invited to the meeting.

The data that is entered into the system from the Conference Room type screens is stored in the Resource DS, and the appropriate triplets such as the Resource Type (RST) Triplet, the Capacity Triplet, Date and Time Triplets.

It will be recalled that a Names List is associated with the Meeting notice and defines the invitees to the meeting. The name list is given a Name so that the meeting caller can call the list rather than repeating all the names each time he wants to call a meeting of the same people. The invitees are identified by Name triplets which also includes an address for each individual in an appropriate associated address triplet. These addresses determine where the meeting notice is sent and fields in the associated User Status triplets permit the invitee to record his answer in terms of status at the meeting, i.e. confirmed, meaning that he will attend.

One of the Name triplets is employed to identify the conference room by name and an associated Network address triplet specifies the CR Node where the Meeting Data structure, the Names list Data structure, the Resource data structure, and the various triplet data structures are sent. A Resource Type (RST) triplet is used for each piece of equipment that was requested and is associated with the RSR data structure which in turn is associated with the Meeting Notice Data structure.

The inventory of conference rooms and available equipment is also maintained by the system using similar data structures employed for maintaining individual calendars.

The individual responsible for managing these rooms and the equipment inventory is referred to as the CR Owner. The CR node is set up to respond automatically when it receives the above mentioned data structures when an owner is calendaring a meeting. The response indicates whether the room is available. If the requested room is not available the response indicates if there is an alternate available for the requested time slot(s).

The response from the CR node also indicates if each of the requested items of equipment is available. In the preferred embodiment of the invention, the appropriate data structures are returned to the meeting caller so a screen can be constructed similar to FIG. 4b in which the name of the conference room is indicated, a 'YES' or 'NO' indication appears after the word AVAILABLE, and an 'R' indicating RESERVED replaces the 'X' in the equipment list when the item has been reserved. If an alternate room has been assigned, then the name of the room is placed on the blank line. If no room is available, the status of the requested items does not change.

In order for an automatic response to be developed at the CR node, the reserved status of the room and equipment, and the alternate room must be maintained on a current basis so that when a request is received for a specific time and set of equipment, the system can, by following a logical process, respond automatically with the correct data.

The Automatic Response data structure employed in connection with the method for developing automatic responses disclosed and claimed in cross-referenced application Ser. No. 008,033 is employed in a modified form to store the data necessary to provide an automatic response that indicates whether the room is available or not.

In setting up the conference room node for an automatic response to every meeting notice requesting a reservation The Automatic Response data structure is employed. In that data structure criteria may be established which if met by the meeting notice causes a preset response to be returned to the meeting caller. The response to be returned is selected by the calendar owner from a number of possible replies displayed on a screen, similar to that illustrated in FIG. 5, that is employed to assist in establishing the auto response function at the node.

In the present method options 1, 3, and 5 are used depending on the situation. Two ARS data structures are employed at the node for the two potential responses from the node. The alternate situation merely requires that the notice and related structures be forwarded to the alternate node. The only criteria employed in the ARS structure is a Priority criteria of 10 or higher which therefore allows all notices to be accepted since 10 is the lowest possible priority in the system.

The system maintains a "Calendar" for the conference room which is identical to the calendars employed by individuals on the system. The conference room calendar differs in that only one event type is permitted, namely a meeting, in the normal course of operation.

The process that occurs at the CR node on reception of a meeting notice is first to confirm that it is a Meeting data structure with a priority of 10 or higher. The next step is to check the time slot(s) on the calendar which correspond to the date and time period of the meeting. If the time slot is vacant then the request is honored and the meeting notice becomes associated with that time slot on the CR calendar. The name triplet which is assigned to the conference and associated with the meeting notice is updated with the correct response from the ARS data structure that was selected by the logical process at the node.

If there is a time slot conflict, the logical process provides a "User Acknowledgement" response unless an alternate room has been identified. If the alternate is identified, the data structures are forwarded to the address of the alternate where the above process is repeated until a room is found or a negative type of a response has to be sent. The system maintains a list of conference room names that were checked in the event the caller wants to see what has happened.

The specific logical process that occurs at the node relative to requests for equipment depends in part on how the equipment is managed in a physical sense. In some situations the equipment is permanently stored and assigned to a given room. If that is the situation then a reservation that is honored for the room would automatically reserve all the equipment in the room. The only contingency that must be reflected is the case where an item is inoperable or out for repairs. In this case the CR node owner can indicate items not available in the room by calling up a screen similar to that illustrated in FIG. 4b and erasing the item or some other suitable action which would be reflected in the corresponding RST data structure for that item. The RSR data structure associated with the CR node therefore can always reflect the status of equipment through the RSR structure.

The logical process therefore merely compares corresponding RSR structures and if they match then the "x" is changed to an "R" when the notice is recreated at the caller's node. The caller's request is therefore confirmed immediately and automatically. If some item of equipment becomes inoperable the system can update each notice that was previously responded to with the new status.

The other implementation of the logical process is directed to the situation where a pool of equipment is maintained for a group of conference rooms and someone is responsible for managing the movement of the equipment among the rooms on a timely basis. In this situation each item of equipment has its own calendar and is managed by the system in the same manner as the conference room calendar.

The logical process at the conference room node searches an equipment calendar having a name corresponding to the name of the item specified by the RST triplet for the time slot specified in the meeting notice. If that time slot is available an entry is made on the calendar referencing the meeting data structure and associated data structures. The logical process then updates the RSR data structure associated with the caller's meeting notice and the next structure is processed. The pool may include a number of the same type of item so a different calendar would exist for each item. If the time slot is taken on one calendar then the other calendars would be checked.

The person who manages the equipment and the logistics can be provided with a printout by the system on a regular basis that indicates what equipment belongs where at what time. Another added advantage is that a log of equipment use can be generated that will assist in understanding if more equipment is needed and the down time on each time.

Figure 6A:
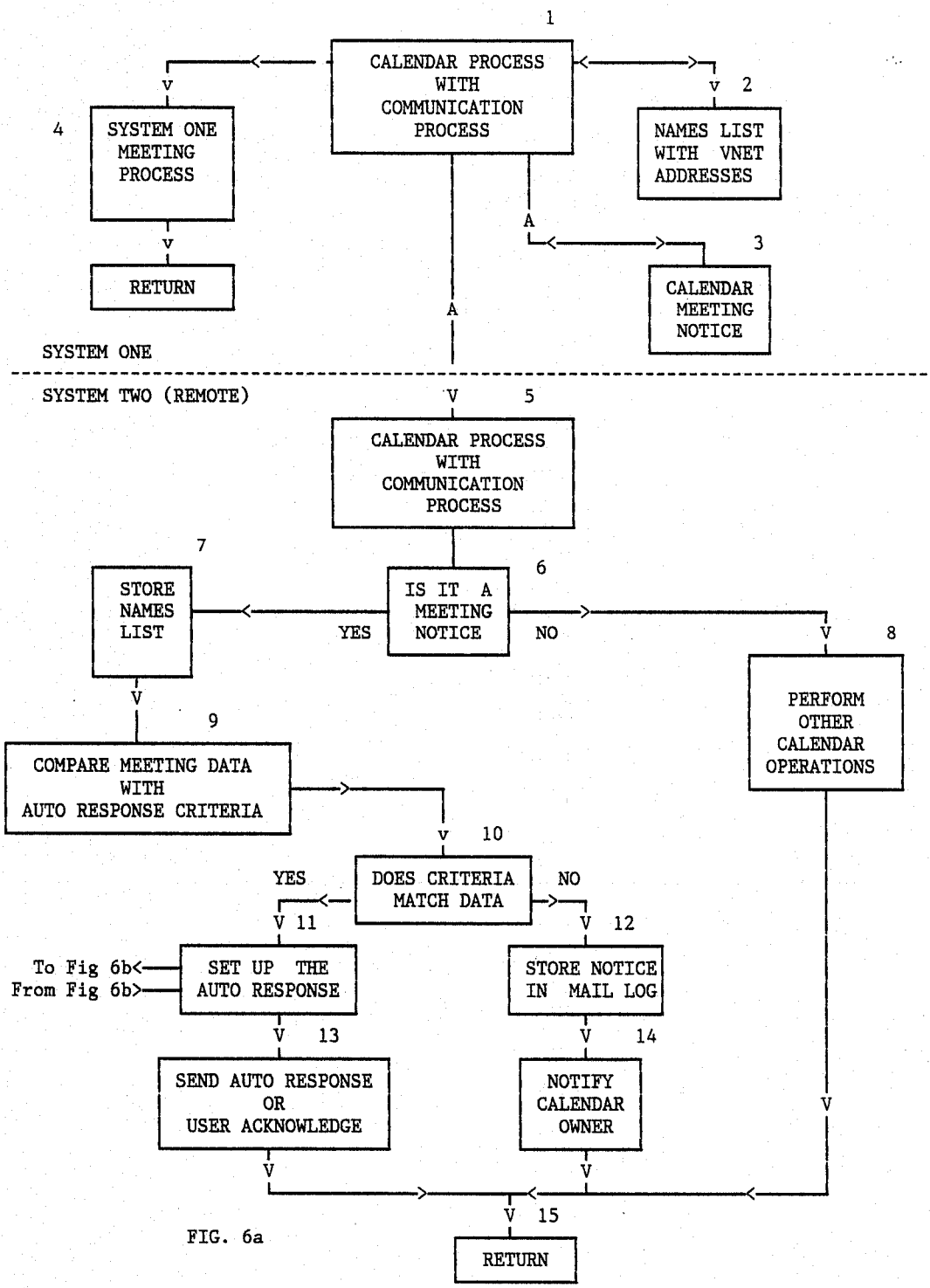
FIGS. 6a–6b are flow charts illustrating various detailed steps of the improved electronic calendar method involved in developing a reply that reflects the availability of requested facilities and equipment.
Figure 6B:
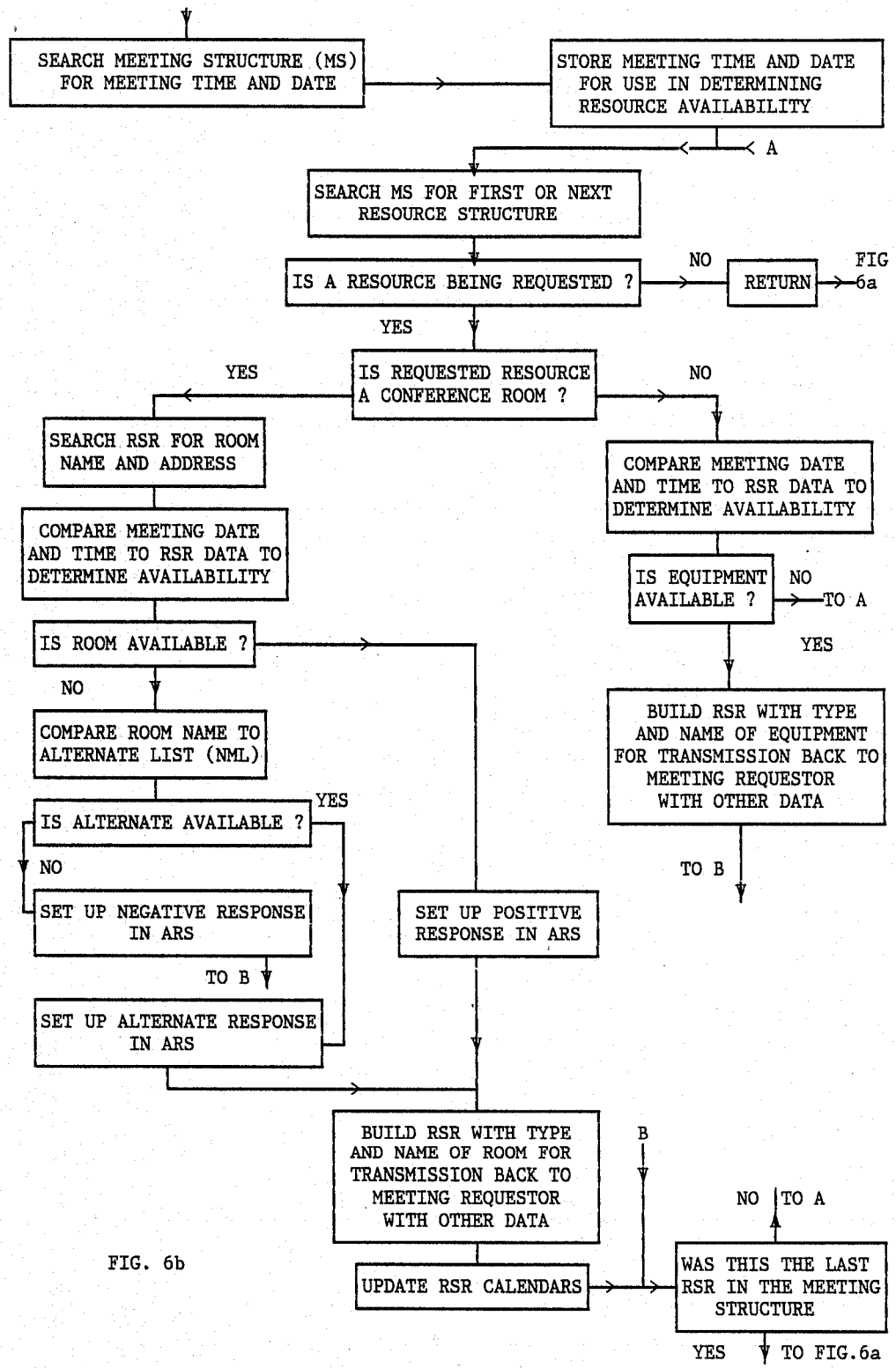

FIGS. 6a and 6b is a flow chart that summarizes the above described process.

It is of course possible to incorporate both implementations in one system selectively by conference rooms or equipment.

While the invention has been shown and described with respect to a preferred embodiment, it should be understood that changes and modifications may be made therein without departing from the spirit of the invention or the scope of the appended claims.

We claim:

1. An electronic calendaring method for use in a data processing system having a plurality of interactive type work stations connected to a host processing system in which a calendar owner can at the time of calendaring a meeting type event on his calendar send a meeting notice through said system to specified system addresses to invite other calendar owners to said meeting at a specified conference room at a designated time and in which one of said system addresses is assigned to an electronic calendar for maintaining the availability status of said conference room and in which a reply is developed automatically in response to receiving a meeting notice at said one said system address which indicates to said calendar owner calling said meeting if said conference room is available at the designated meeting time and what items of equipment are available for use at said meeting, said method comprising the steps of:
 (a) establishing a plurality of data structures for
  (1) defining different types of events to be calendared including said meeting type event,
  (2) storing data that is entered into said system interactively by calendar owners which further defines details of events that are calendared and assists said system in processing calendared events,
  (3) developing said reply in response to receiving said meeting notice indicating the availability of said conference room and said items of equipment that are available for use in said conference room during said meeting,
 (b) maintaining at a predefined system address said electronic calendar for said specified conference room which includes a plurality of established time slots for indicating the status of said conference room,
 (c) entering data interactively into said system for storage in at least one set of two similar said data structures each of which specifies the same criteria which must be met by said meeting notice before said automatic response is developed, and each of which designates a different response, and
 (d) selecting one of said data structures of said set depending on whether the time slot(s) on said conference room calendar corresponding to the meeting time is available.

2. The method recited in claim 1 in which said step of establishing includes the step of establishing an Automatic Response data structure having specific fields for storing said criteria data and said different responses, further including the step of comparing said criteria data stored is said specific field with corresponding data in said meeting notice to determine if said automatic reply should be developed.

3. The method recited in claim 2 in which said step of selecting includes the further step of determining if the time slot on said conference room calendar which corresponds to said specified time of said meeting is vacant.

4. The method recited in claim 3 in which said step of establishing further includes the step of establishing a Meeting data structure for storing details of said meeting including the time period of the meeting and said step of determining includes the step of employing said specified time of said meeting stored in said Meeting data structure to identify said corresponding time slot on said conference room calendar.

5. The method recited in claim 4 in which said step of establishing further includes the step of establishing a Resource data structure for storing resource data defining the resources available for and requested to support said meeting, including an individual data structure to specifically identify each conference room and each item of equipment that is available to support said meeting in said conference room.

6. The method recited in claim 5 further including the step of entering said resource data into said system interactively.

7. The method recited in claim 6 further including the steps of maintaining a calendar for each of said identified resources to assist in determining the availability status of an item of equipment that is being requested to support said meeting that is defined in said Meeting data structure that is sent to said one system address.

8. The method recited in claim 7 further including the steps of determining the availability of a requested item of equipment by inspecting said time slot on the calendar that is maintained by said system that corresponds to said designated time of said meeting and indicating if said time slot contains an entry.

* * * * *